(12) United States Patent
Marroncelli et al.

(10) Patent No.: US 11,644,161 B2
(45) Date of Patent: May 9, 2023

(54) FLEXIBLE LIGHTING SYSTEM

(71) Applicant: Frontline Lighting LLC, Butler, PA (US)

(72) Inventors: Darrell Frank Marroncelli, Hampton, NH (US); Patrick William Maloney, Burnt Hills, NY (US); James J. Levante, Tempe, AZ (US); Anthony James Simons, Sydney (AU); Jeffrey Thomas Saunders, North Narrabeen (AU)

(73) Assignee: Frontline Lighting LLC, Butler, PA (US)

( * ) Notice: Subject to any disclaimer, the term of this patent is extended or adjusted under 35 U.S.C. 154(b) by 299 days.

(21) Appl. No.: 16/814,429

(22) Filed: Mar. 10, 2020

(65) Prior Publication Data

US 2020/0292141 A1 Sep. 17, 2020

Related U.S. Application Data

(60) Provisional application No. 62/818,309, filed on Mar. 14, 2019.

(51) Int. Cl.
*F21S 4/24* (2016.01)
*A45F 3/04* (2006.01)
(Continued)

(52) U.S. Cl.
CPC .............. *F21S 4/24* (2016.01); *A45F 3/04* (2013.01); *G06F 13/4282* (2013.01);
(Continued)

(58) Field of Classification Search
CPC .......... F21S 4/24; A45F 3/04; G06F 13/4282; G06F 2213/0042; H02M 7/003; H05B 45/10; F21Y 2115/10
See application file for complete search history.

(56) References Cited

U.S. PATENT DOCUMENTS 5,424,926 A * 6/1995 Myers .................... A45C 15/06
362/253
2004/0090773 A1* 5/2004 Bryan .................... H02J 7/0044
362/183
(Continued)

FOREIGN PATENT DOCUMENTS

ES 2525413 T3 * 12/2014 ........... B29C 47/003
WO WO-2012063210 A1 * 5/2012 ............. A45C 15/06

OTHER PUBLICATIONS

Notification of Transmittal of the International Search Report and Written Opinion of the International Searching Authority, or the Declaration for International Application No. PCT/US2020/021877, dated Mar. 10, 2020, pp. 1-13.

*Primary Examiner* — Tracie Y Green
(74) *Attorney, Agent, or Firm* — Nancy R. Gamburd; Gamburd Law Group LLC

(57) ABSTRACT

A representative embodiment of a lighting system includes a carrying bag having a first opening with a control panel cover; a mounting bracket arranged in the carrying bag; a power supply coupled to or arranged on the mounting bracket; a control panel arranged within the first opening and coupled to the mounting bracket; a first flexible light strip; a second flexible light strip; and a power cable coupleable within the carrying bag to the control panel, the first flexible light strip, and the second flexible light strip. The first and second flexible light strips are coupleable to the power cable to receive DC power from the control panel, and may be extended throughout a structure, such as a tent, using a plurality of hangers. In a representative embodiment, the first flexible light strip provides white light and the second flexible light strip provides blackout light.

20 Claims, 16 Drawing Sheets

(51) Int. Cl.
*H05B 45/10* (2020.01)
*H02M 7/00* (2006.01)
*G06F 13/42* (2006.01)
*F21Y 115/10* (2016.01)

(52) U.S. Cl.
CPC ............ H02M 7/003 (2013.01); H05B 45/10 (2020.01); *F21Y 2115/10* (2016.08); *G06F 2213/0042* (2013.01)

(56) References Cited

U.S. PATENT DOCUMENTS

| | | | |
|---|---|---|---|
| 2004/0145893 A1* | 7/2004 | Lemay ................ | B60Q 3/14 362/230 |
| 2012/0002417 A1* | 1/2012 | Li ........................ | F21S 4/28 362/249.02 |
| 2018/0242701 A1* | 8/2018 | Seiders ............... | A45C 13/008 |

* cited by examiner

WHITE FLEX LIGHT

BLACK OUT FLEX LIGHT

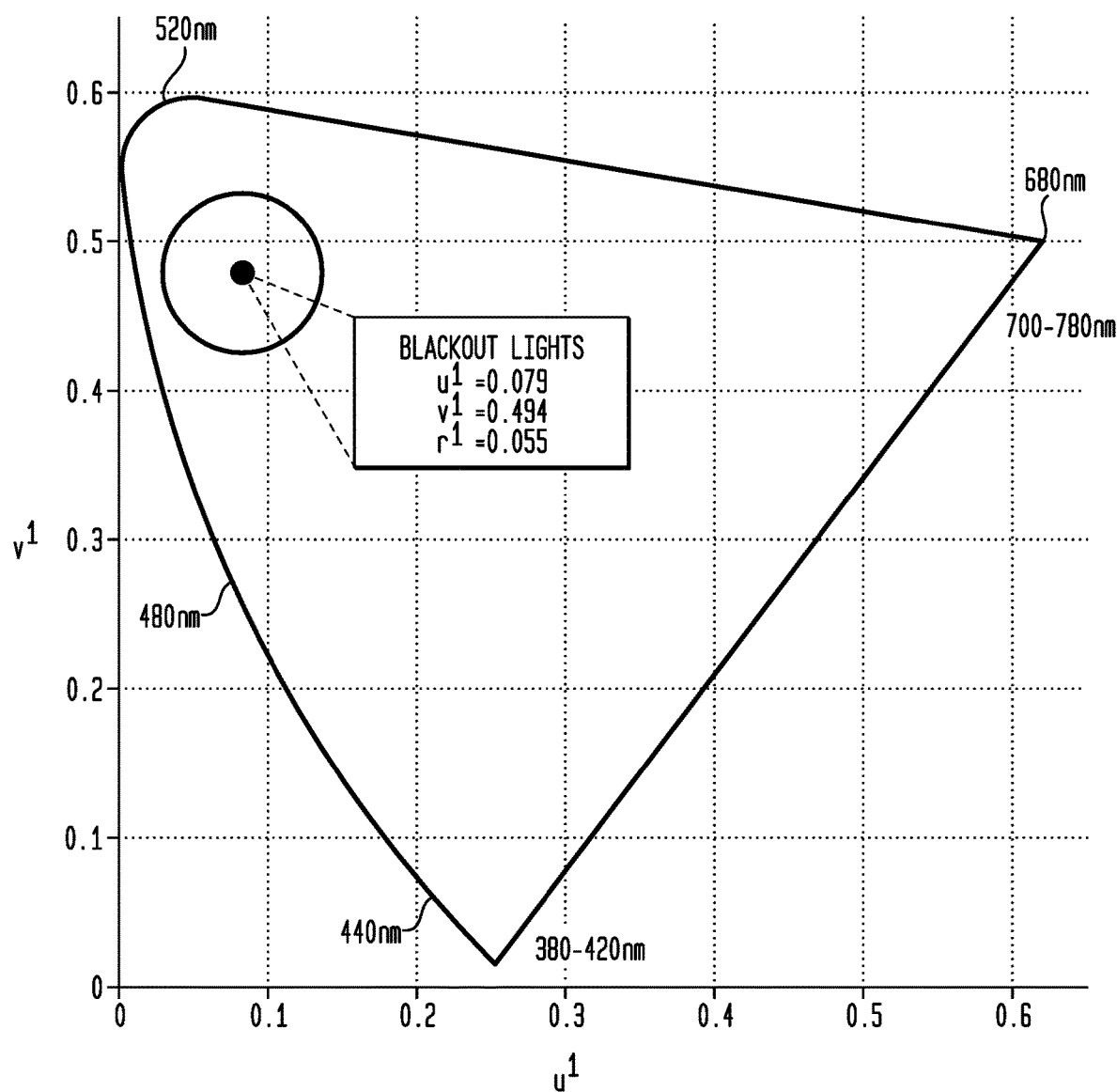

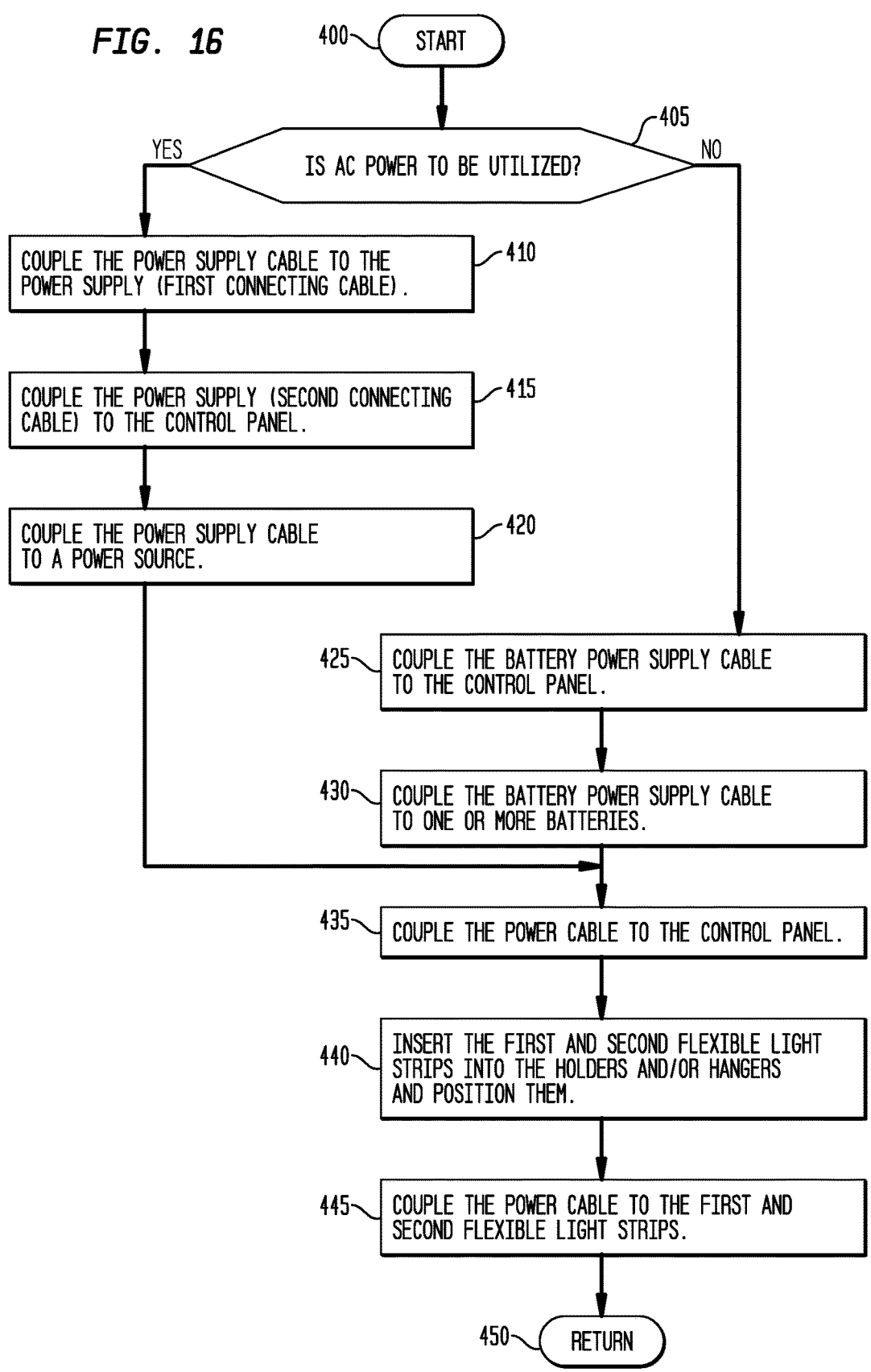

FLEXIBLE LIGHTING SYSTEM

CROSS-REFERENCE TO A RELATED APPLICATION

This application is a nonprovisional of and claims the benefit of and priority to U.S. Provisional Patent Application No. 62/818,309, filed Mar. 14, 2019, inventors Darrell Frank Marroncelli et al., titled "Flexible Lighting System", which is commonly assigned herewith, and all of which is hereby incorporated herein by reference in its entirety with the same full force and effect as if set forth in its entirety herein.

FIELD OF THE INVENTION

The present invention, in general, relates to lighting technology, and more particularly, relates to a flexible lighting system which is portable, robust, and capable of ready assembly to provide lighting in difficult or problematic industrial or hostile environments.

BACKGROUND OF THE INVENTION

Physically hostile environments represent a significantly difficult condition for lighting systems. Traditional lighting systems such as florescent tubes and incandescent bulbs suffer high fragility in these environments, including mining, construction, industrial, military, and war zone environments. Even "armoring" such lighting devices only provides a slight extension of working lifetime under such stressful conditions. For example, lighting device lifetimes can frequently be measured in a few hours for these devices in hostile environments. Worse, failures due to crushing and other mechanical insult may result in mercury contamination to the work site or troop tent. Clearly there is a need for a more robust lighting solution that both survives environments like battlefields, mining and heavy construction and provides sufficient illumination for safety purposes and other activities.

As a consequence, a need remains for flexible lighting system which is portable, robust, and capable of ready assembly to provide lighting in rugged, difficult or problematic industrial or hostile environments. Such lighting system should be comparatively easy and rapid to assemble and deploy, such as in military tents.

SUMMARY OF THE INVENTION

The exemplary or representative embodiments of the present invention provide numerous advantages. Various representative embodiments provide a flexible lighting system which is portable, robust, and capable of ready assembly to provide lighting in rugged, difficult or problematic industrial or hostile environments. Representative embodiments of the lighting system are comparatively easy and rapid to assemble and deploy, such as in military tents.

The representative embodiments of the lighting system utilize flexible light strips, which may be hung in structures such as tents. Once they are installed, they may be left installed and the tent stored, allowing for a one-time setup. The representative embodiments of the lighting system include an integrated power supply and/or battery, with a control panel providing switching and dimming capability, including switching between white light and blackout light, all contained within a portable carrying bag or other portable container. The representative embodiments of the flexible light strips provide for comparatively even light distribution, with considerably less shadowing compared to prior art lighting systems. The representative embodiments of the lighting system are also comparatively light weight and water resistant, and capable of operating in rugged environments, such as military deployments and camps. For example, in a representative embodiment, the lighting system weighs only about 12 lbs. (5.5 kg), and is capable of operating between −20° C. to +85° C. The representative embodiments of the lighting system also may operate in either alternating current ("AC") or direct current ("DC") environments.

In a representative embodiment, a lighting system comprises: a carrying bag or other container having a first opening and a second opening, the carrying bag further having a control panel cover removably fastenable over the first opening; a mounting bracket arranged in the carrying bag; a power supply coupled to or arranged on the mounting bracket; a control panel arranged within the first opening and coupled to the mounting bracket; a first flexible light strip; a second flexible light strip; and a power cable coupleable (or couplable) to the control panel, to the first flexible light strip, and to the second flexible light strip, the power cable extendable through the second opening.

In a representative embodiment, the lighting system may further comprise: a plurality of hangers coupleable to the first flexible light strip and the second flexible light strip. For example, in a representative embodiment, the plurality of hangers may comprise: a plurality of light strip holders adapted to secure the first flexible light strip and the second flexible light strip; at least one length of paracord coupleable to a light strip holder of the plurality of light strip holders; a plurality of snap hook fasteners, at least one snap hook fastener of the plurality of snap hook fasteners coupleable to the at least one length of paracord; and a plurality of adjustment clips, at least one adjustment clip of the plurality of adjustment clips coupleable to the at least one length of paracord.

In a representative embodiment, the control panel may comprise: a dimmer switch to adjust light output from the first flexible light strip or the second flexible light strip; a selection switch adapted to select either the first flexible light strip for light output, the second flexible light strip for light output, or turn off both the first flexible light strip and the second flexible light strip; and one or more USB ports.

In a representative embodiment, the power cable comprises a first connector, and wherein the control panel further comprises a mating, output DC connector coupleable within the carrying bag to the first connector of the power cable. In a representative embodiment, the power cable may further comprise a plurality of second connectors, and each of the first flexible light strip and the second flexible light strip further comprise a mating third connector coupleable to a corresponding second connector of the power cable.

In a representative embodiment, the control panel further comprises an input DC connector, and the power supply further comprises a DC output connecting cable having a mating connector coupleable within the carrying bag to the input DC connector of the control panel.

In a representative embodiment, a lighting system may further comprise: a power supply cable having a first end and a second end, the power supply cable comprising a first connector at the first end coupleable to receive AC power and further comprising a second connector at the second end. In such a representative embodiment, the power supply may further comprise a input power connecting cable having a mating connector coupleable within the carrying bag to the second connector of the power supply cable.

In another representative embodiment, the control panel further comprises an input DC connector, and the lighting system may further comprise: a battery power supply cable having at least one first connector coupleable to one or more mating connectors of one or more batteries and having a second connector coupleable within the carrying bag to the input DC connector of the control panel.

In a representative embodiment, the power supply is operable to receive AC power at 120-280±5 V AC at 50-60±5 Hz and the power supply is adapted to generate 24 V DC at 8-10 Amperes with 200-240 W.

In another representative embodiment, at least one of the first flexible light strip or the second flexible light strip comprises a plurality of light emitting diodes adapted to emit light having a spectrum within a chromaticity range of, or chromaticity circle defined as, $u'=0.079$, $v'=0.494$, and $r'=0.055$.

In a representative embodiment, the mounting bracket, the power supply, the control panel, the first flexible light strip, the second flexible light strip, and the power cable are provided as a kit within the carrying bag.

In a representative embodiment, a lighting system comprises: a carrying bag having a first opening and a second opening, the carrying bag further having a control panel cover removably or releasably fastenable over the first opening; a mounting bracket arranged within the carrying bag; a power supply coupled to or arranged on the mounting bracket; a control panel arranged within the first opening and coupled to the mounting bracket; a first flexible light strip; a second flexible light strip; a power cable coupleable to the control panel within the carrying bag, and extendable through the second opening to couple to the first flexible light strip and to the second flexible light strip; a plurality of hangers or holders coupleable to the first flexible light strip and the second flexible light strip; a battery power supply cable coupleable to the control panel and to one or more batteries; and a power supply cable coupleable to the power supply and to an AC source.

In another representative embodiment, a lighting system comprises: a first flexible light strip; a second flexible light strip; a plurality of hangers or holders coupleable to the first flexible light strip and the second flexible light strip; a carrying bag having a first opening and a second opening, the carrying bag further having a control panel cover removably or releasably fastenable over the first opening; a power cable extendable through the second opening and coupleable to the first flexible light strip and to the second flexible light strip; a mounting bracket arranged within the carrying bag; a power supply coupled to or arranged on the mounting bracket; a control panel arranged within the first opening, the control panel coupled to the mounting bracket, the control panel electrically coupled to the power supply and to the power cable, the control panel comprising: a dimmer switch to adjust light output from the first flexible light strip or the second flexible light strip; a selection switch adapted to select either the first flexible light strip for light output, the second flexible light strip for light output, or turn off both the first flexible light strip and the second flexible light strip; and one or more USB ports; and the lighting system further comprising at least one of a battery power supply cable or a power supply cable, the battery power supply cable coupleable to the control panel and to one or more batteries and the power supply cable coupleable to the power supply and to an AC source.

In a representative embodiment, the power cable may comprise a first connector and a plurality of second connectors, wherein the control panel further comprises a mating, output DC connector coupleable within the carrying bag to the first connector of the power cable, and wherein each of the first flexible light strip and the second flexible light strip further comprise a mating third connector coupleable to a corresponding second connector of the plurality of second connectors of the power cable.

In a representative embodiment, the control panel may further comprise an input DC connector, wherein the power supply further comprises a DC output connecting cable having a first mating connector coupleable within the carrying bag to the input DC connector of the control panel, wherein the power supply cable has a first end and a second end, the power supply cable comprising a first connector at the first end coupleable to receive AC power and further comprising a second connector at the second end, and wherein the power supply further comprises an input power connecting cable having a second mating connector coupleable within the carrying bag to the second connector of the power supply cable.

A method of assembling or deploying the lighting system is also disclosed, with a representative method embodiment comprising: arranging the first flexible light strip and the second flexible light strip at one or more selected locations; connecting the power cable to the control panel within the carrying bag; extending the power cable through the second opening and coupling the power cable to the first flexible light strip and the second flexible light strip; coupling the power supply to the control panel within the carrying bag; coupling the power supply cable to the power supply; and coupling the power supply cable to receive AC power.

Another method of assembling or deploying the lighting system is also disclosed, with a representative method embodiment comprising: arranging the first flexible light strip and the second flexible light strip at one or more selected locations; connecting the power cable to the control panel within the carrying bag; extending the power cable through the second opening and coupling the power cable to the first flexible light strip and the second flexible light strip; coupling the battery power supply cable to the control panel within the carrying bag; and coupling the battery power supply cable to one or more batteries.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 15 is a graphical diagram or chart illustrating a selected chromaticity range for a second flexible light strip for selected embodiments of the lighting system.

FIG. 16 is a flow chart illustrating a method of assembly and deployment of a representative embodiment of the lighting system.

DETAILED DESCRIPTION OF REPRESENTATIVE EMBODIMENTS

Figure 1:
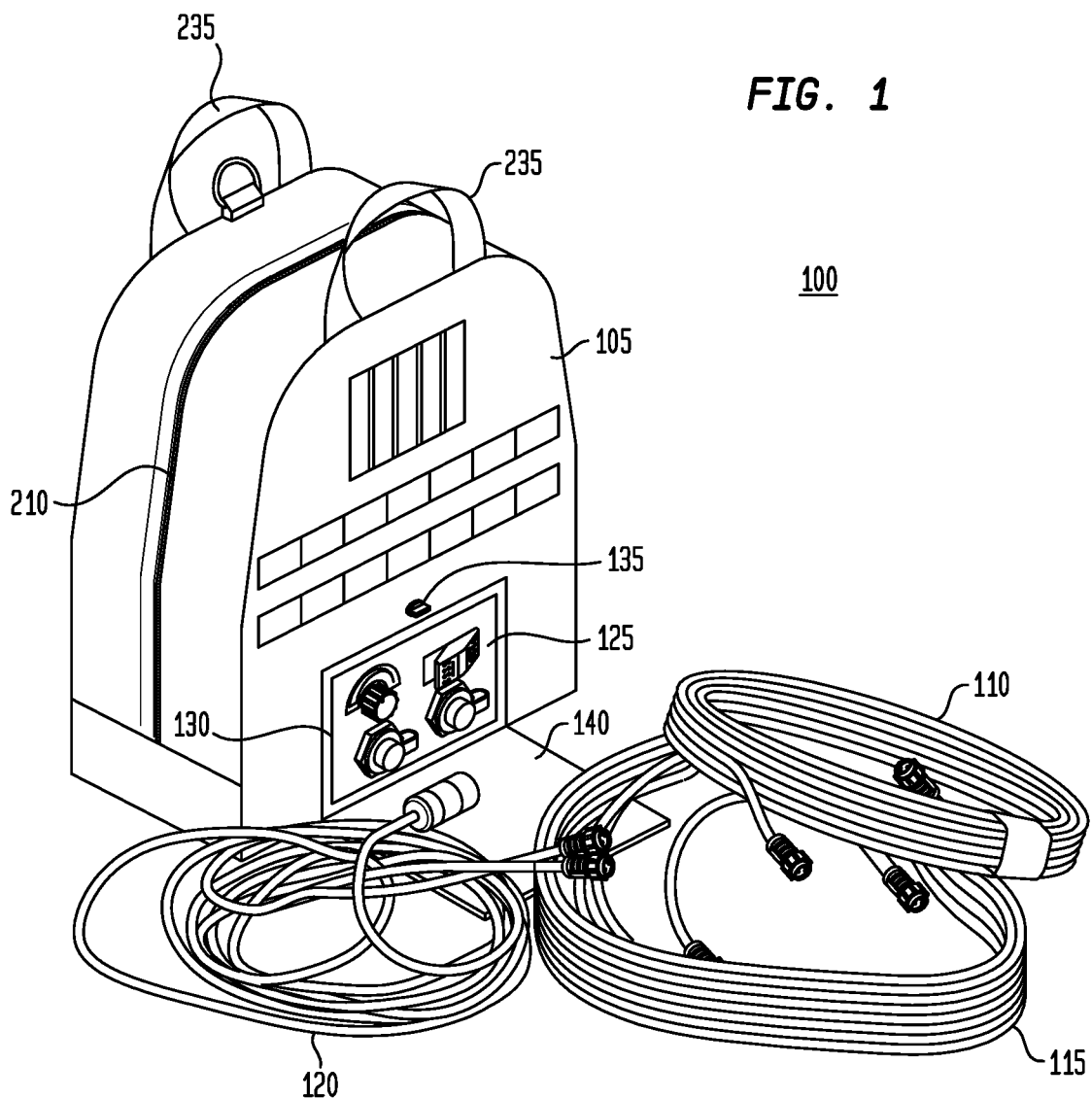
FIG. 1 is an isometric view illustrating a representative embodiment of components of a lighting system.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
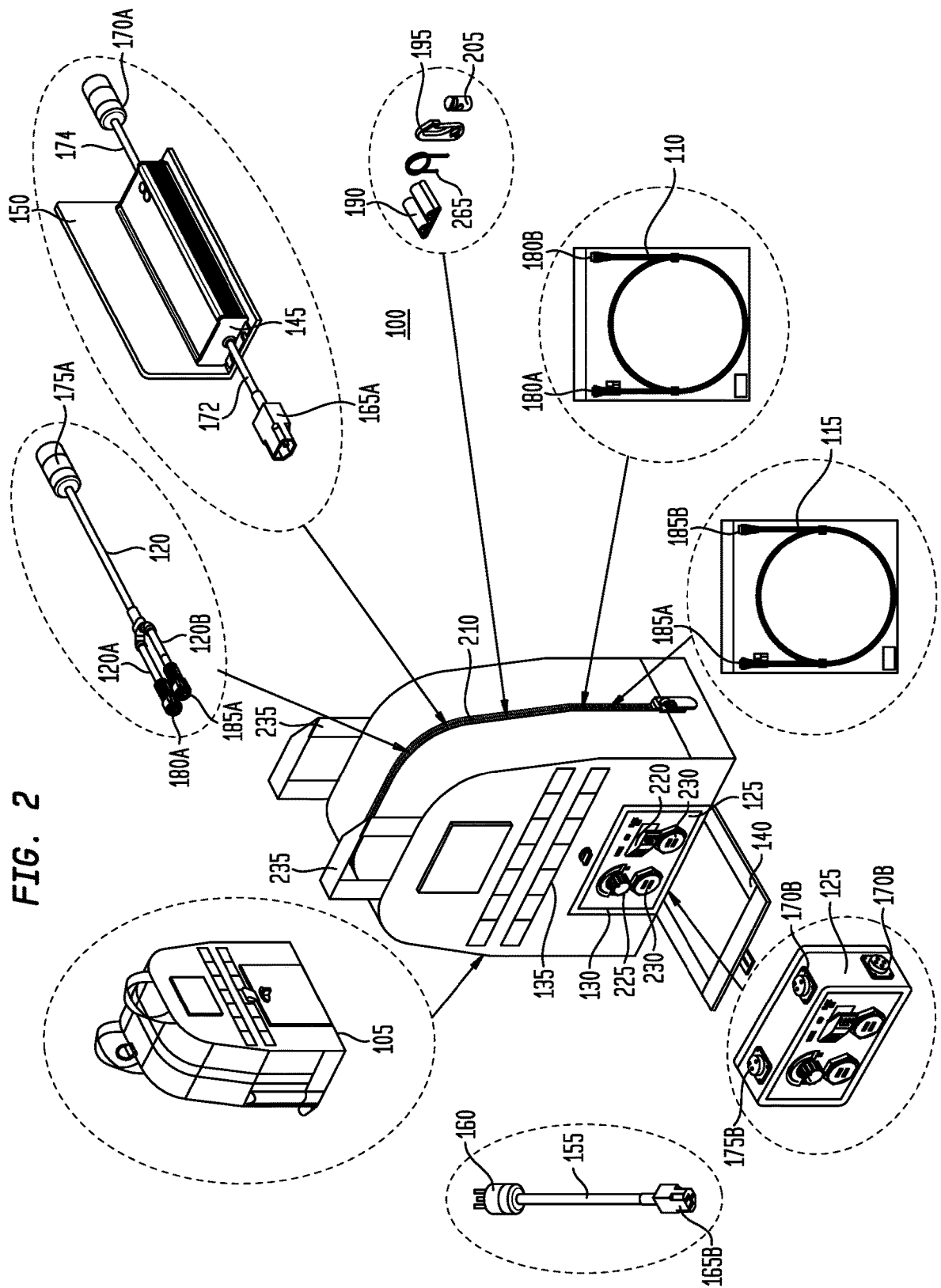
FIG. 2 is an isometric, exploded view illustrating a representative embodiment of the lighting system.
Figure 3:
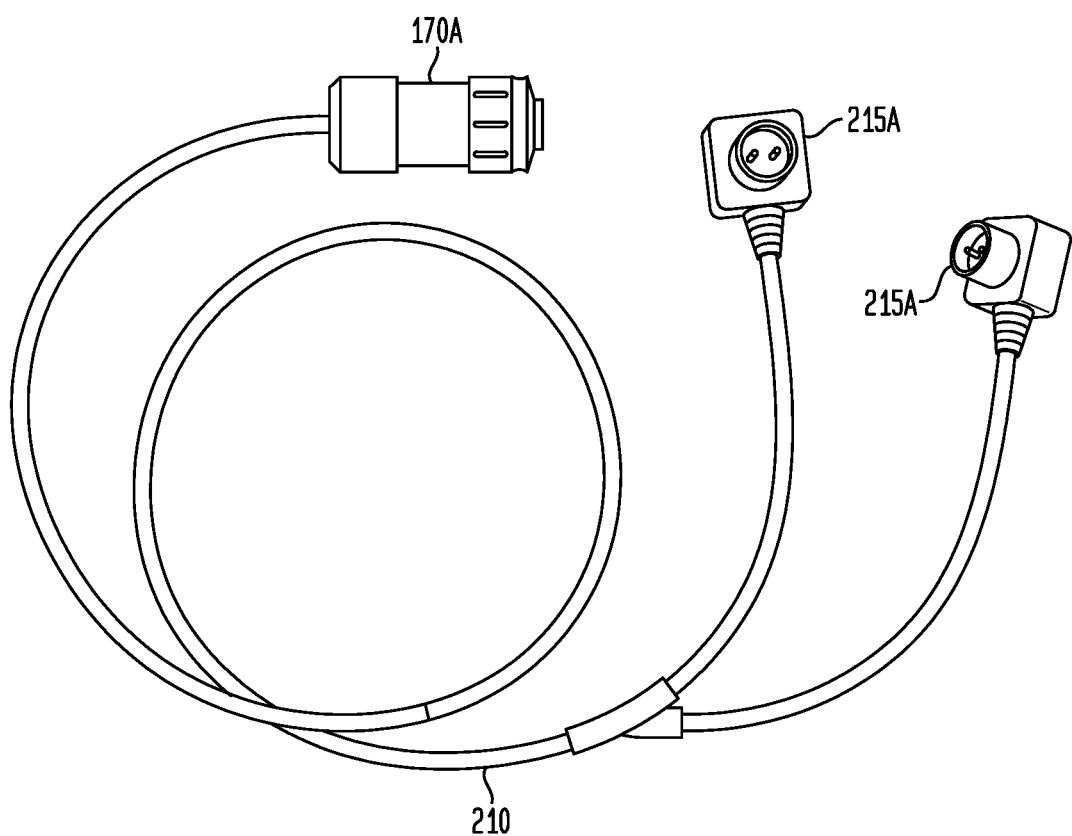
FIG. 3 is an isometric view illustrating a representative embodiment of a battery power supply cable of the lighting system.
Figure 4:
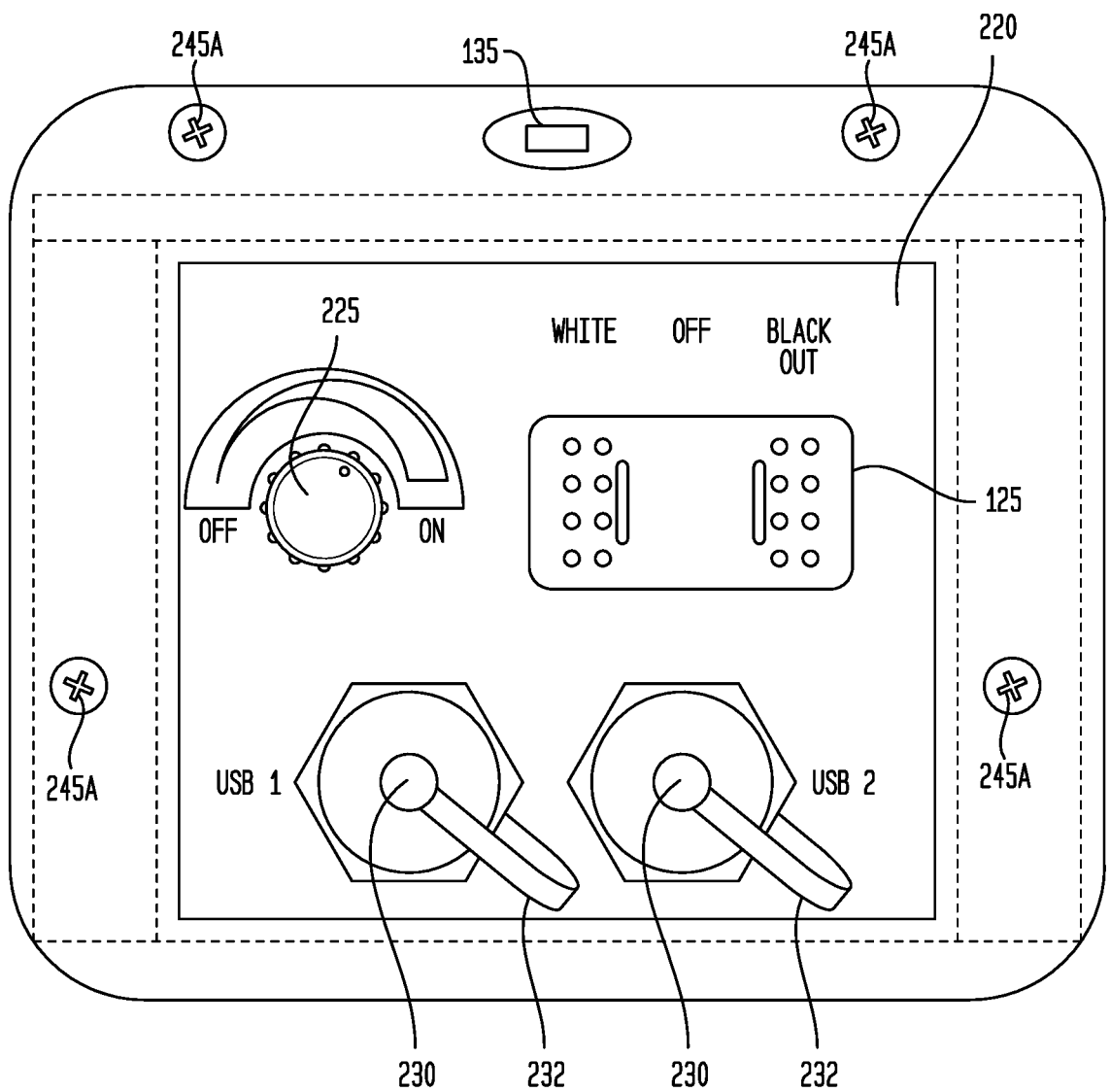
FIG. 4 is a front, plan view illustrating a representative embodiment of a control panel for the lighting system.
Figure 5:
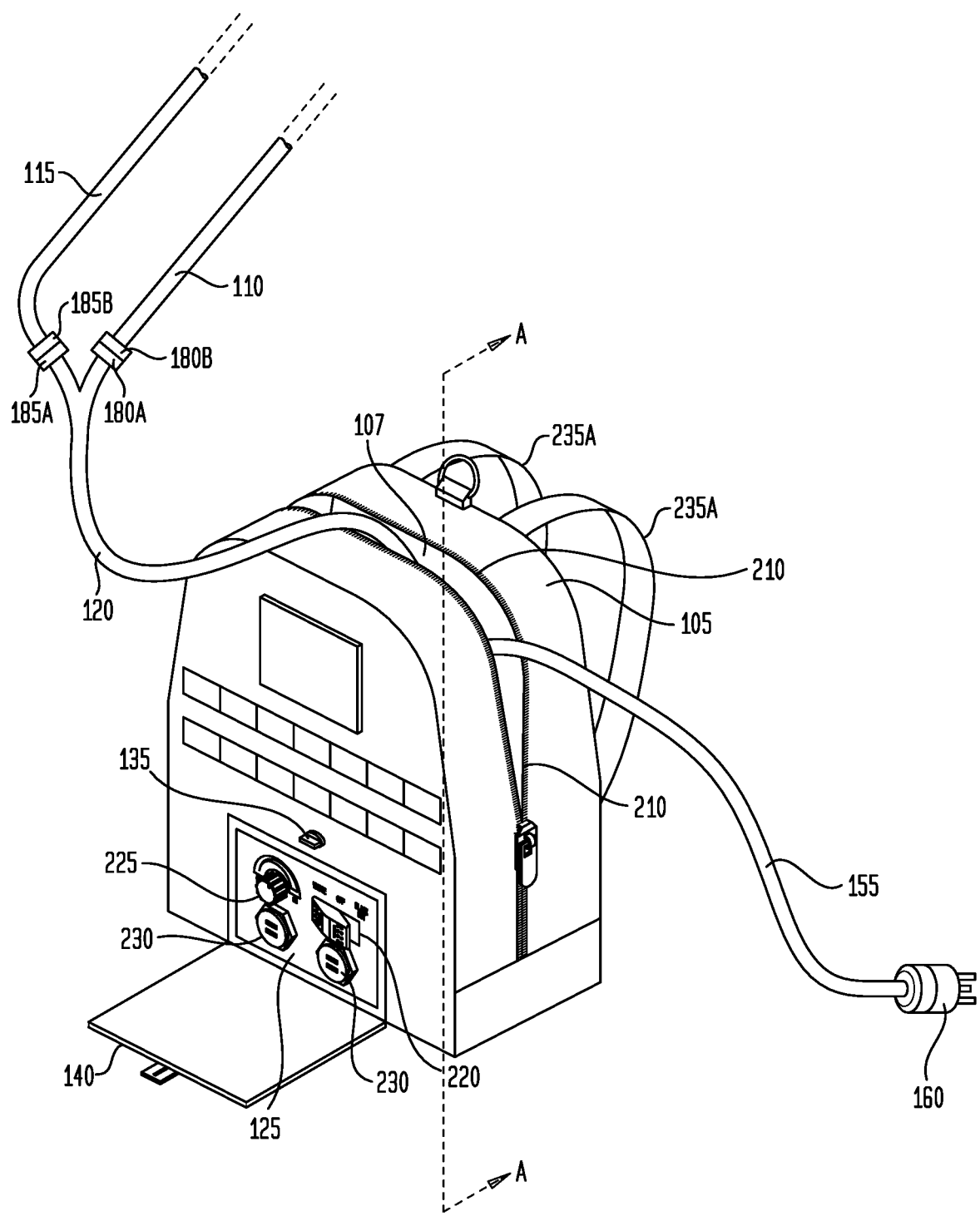
FIG. 5 is an isometric view illustrating a representative embodiment of the lighting system.
Figure 6:
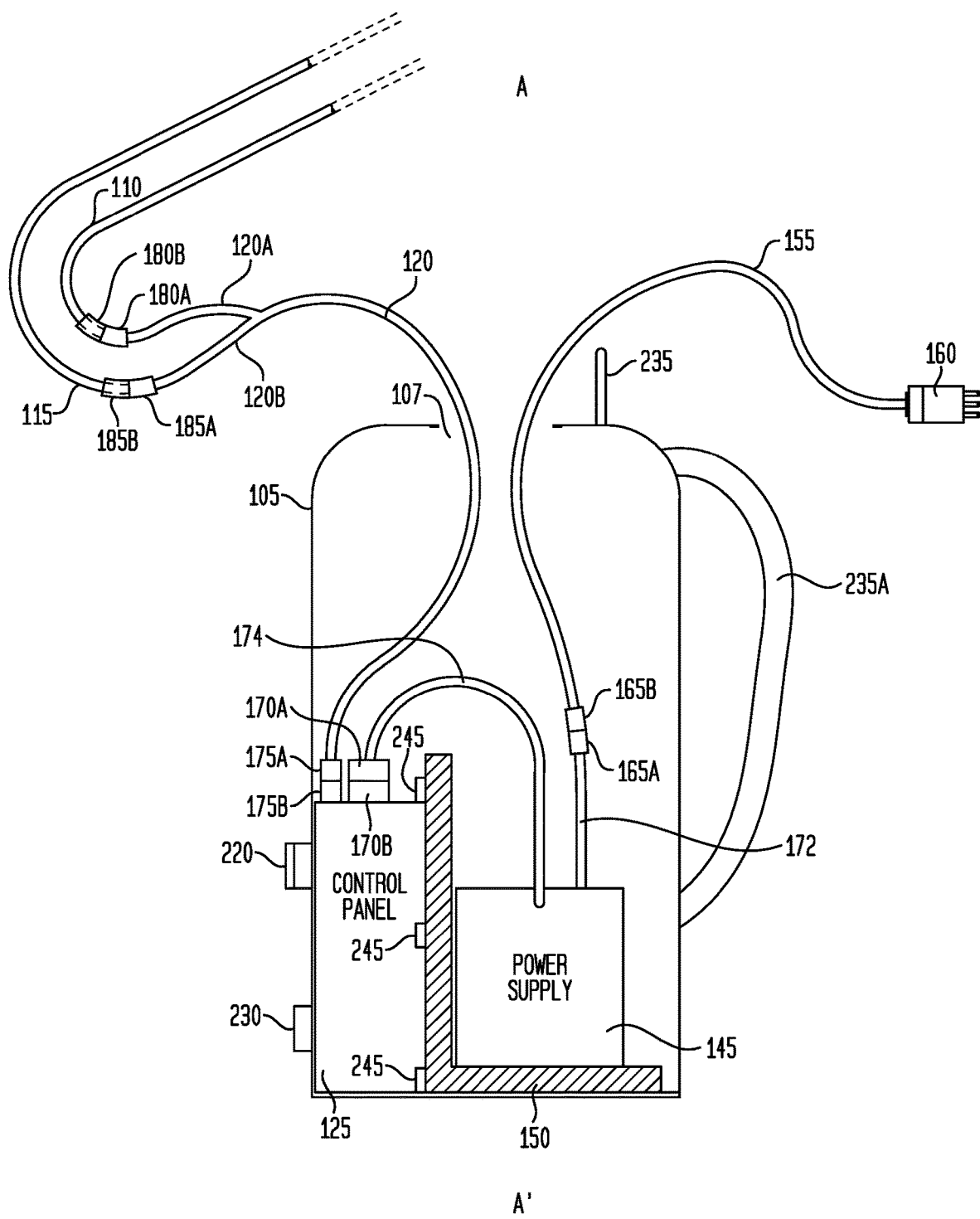
FIG. 6 is a cut-away view through the A-A' plane of the representative embodiment of the lighting system of FIG. 5.
Figure 7:
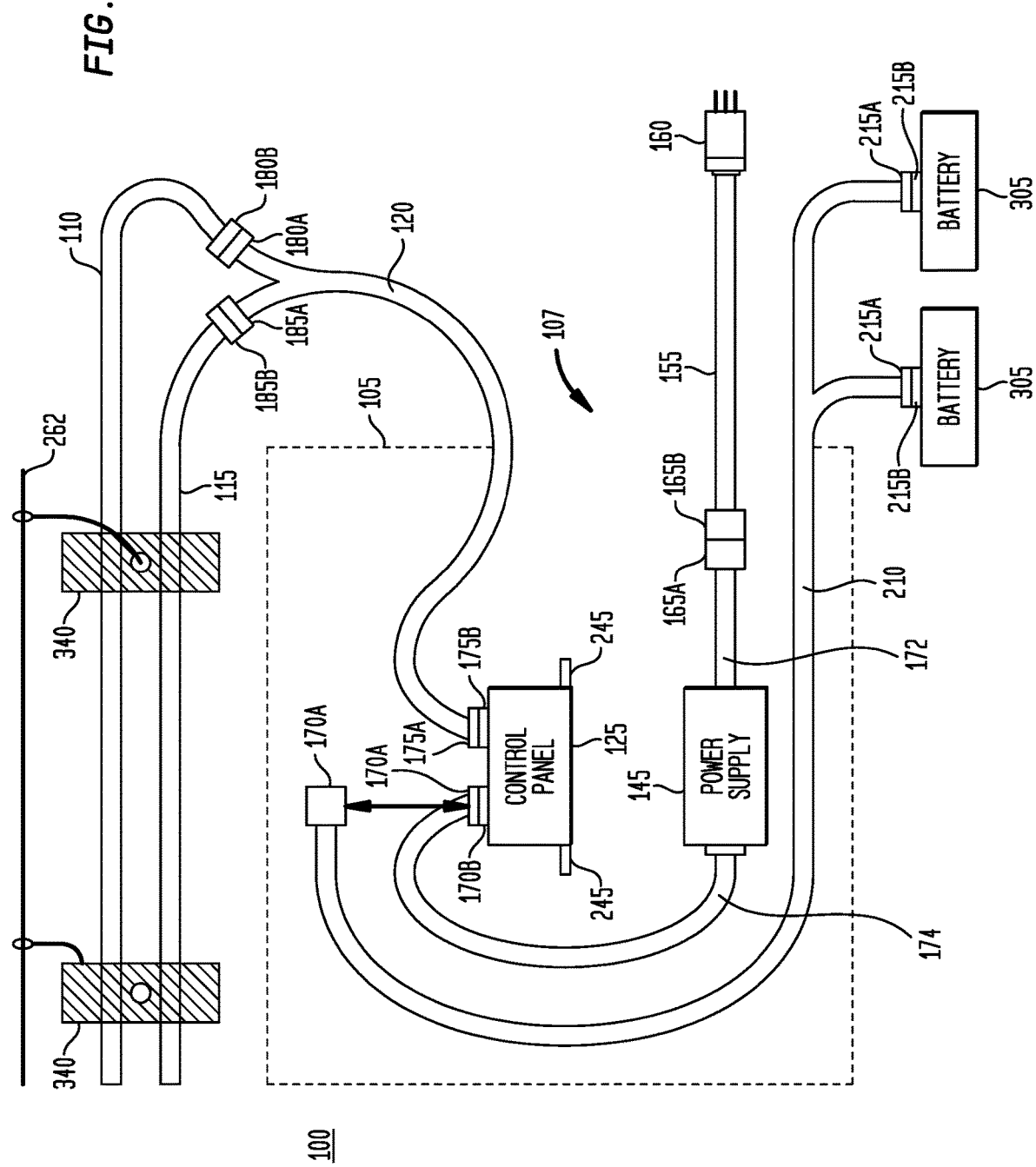
FIG. 7 is a schematic view illustrating electrical couplings and assembly of a representative embodiment of the assembled lighting system.

FIG. 1 is an isometric view illustrating a representative embodiment of components of a lighting system 100. FIG. 2 is an isometric, exploded view illustrating a representative embodiment of the lighting system 100. FIG. 3 is an isometric view illustrating a representative embodiment of a battery power supply cable 210 of the lighting system 100. FIG. 4 is a front, plan view illustrating a representative embodiment of a control panel 125 for the lighting system 100. FIG. 5 is an isometric view illustrating a representative embodiment of the lighting system 100. FIG. 6 is a cut-away view through the A-A' plane of the representative embodiment of the lighting system 100 of FIG. 5. FIG. 7 is a schematic view illustrating electrical couplings and assembly of a representative embodiment of the assembled lighting system 100, showing electrical couplings of the assembled lighting system 100 during deployment.

Figure 8:
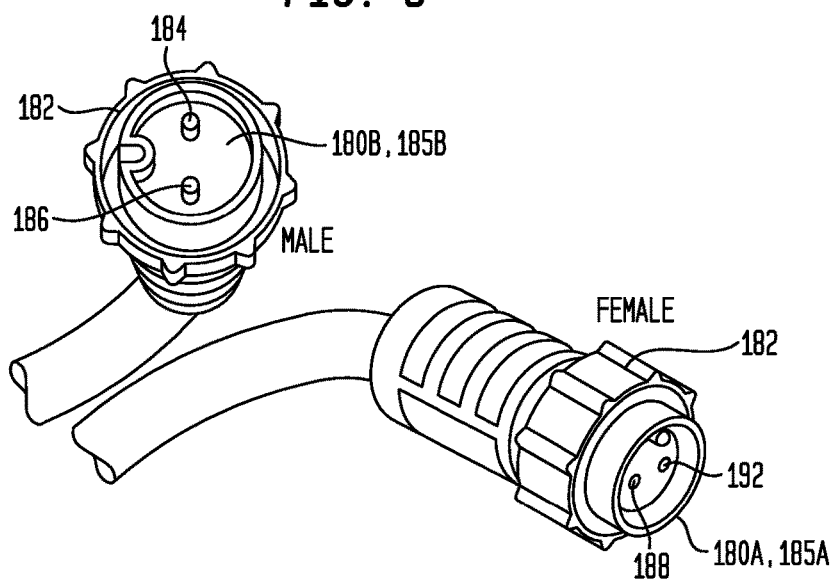
FIG. 8 is an isometric view illustrating a representative embodiment of male and female connectors used with the lighting system.
Figure 9:
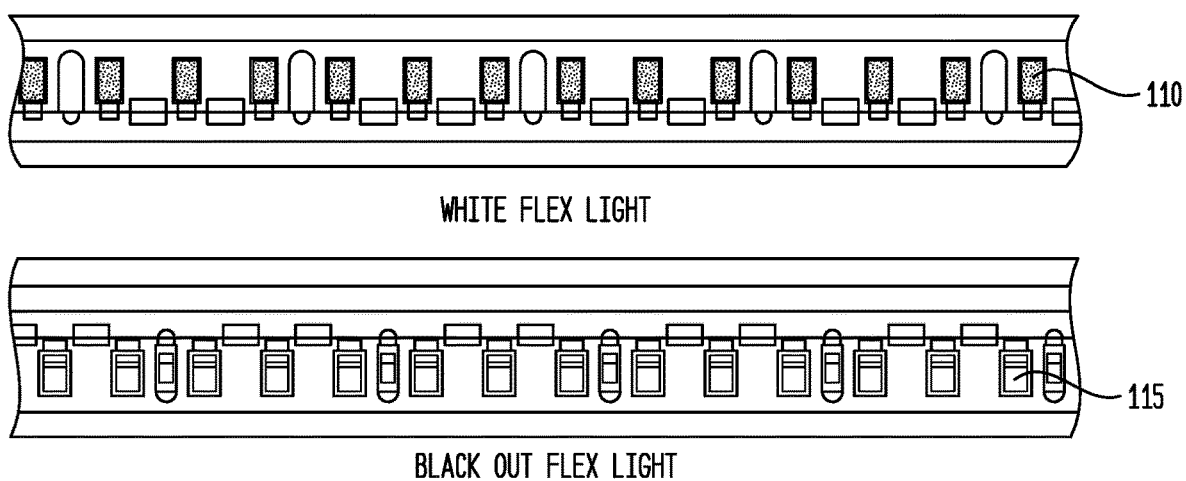
FIG. 9 is a photograph of representative embodiments of flexible light strips used with the lighting system.
Figure 10:
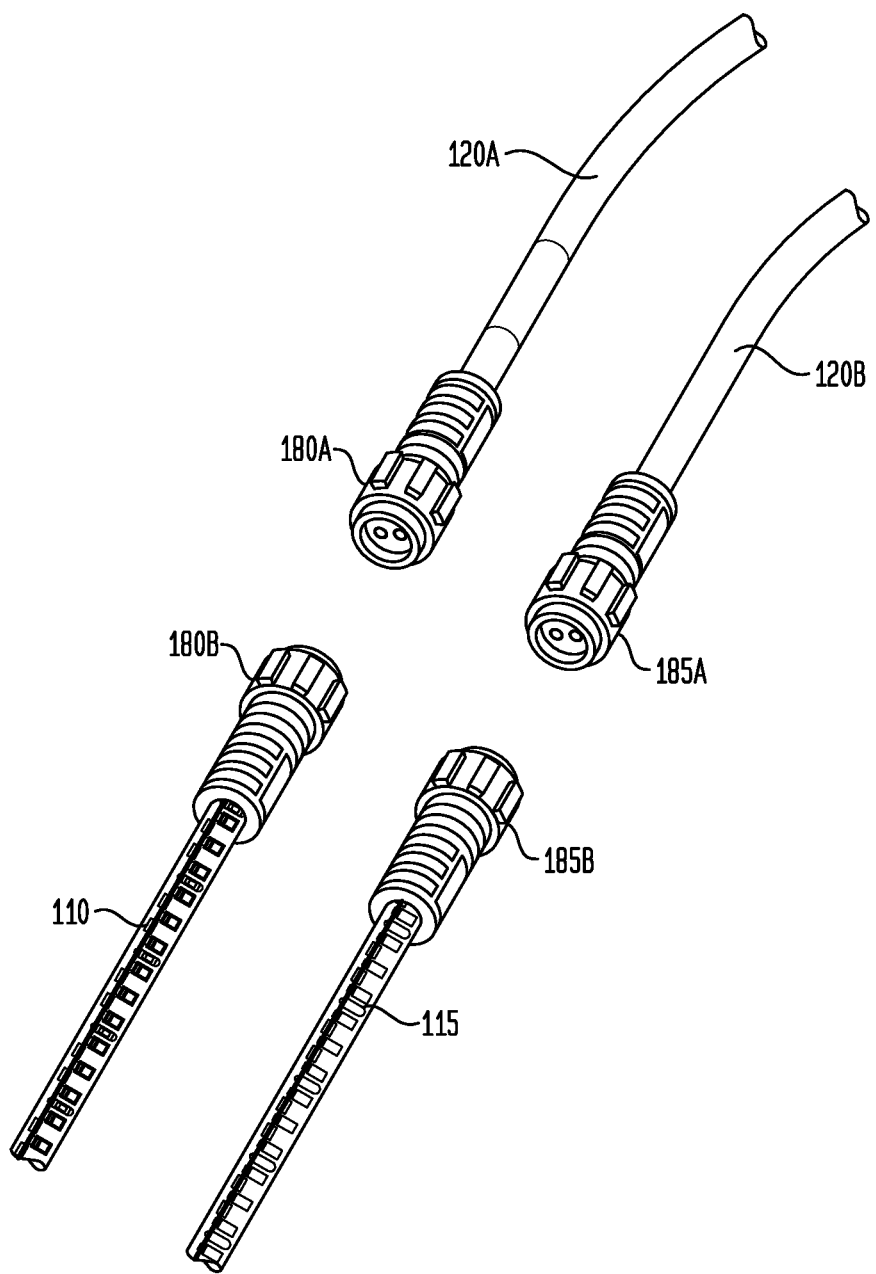
FIG. 10 is an isometric view illustrating a representative embodiment of flexible light strips with the power cable and corresponding male and female connectors used with the lighting system.
Figure 11:
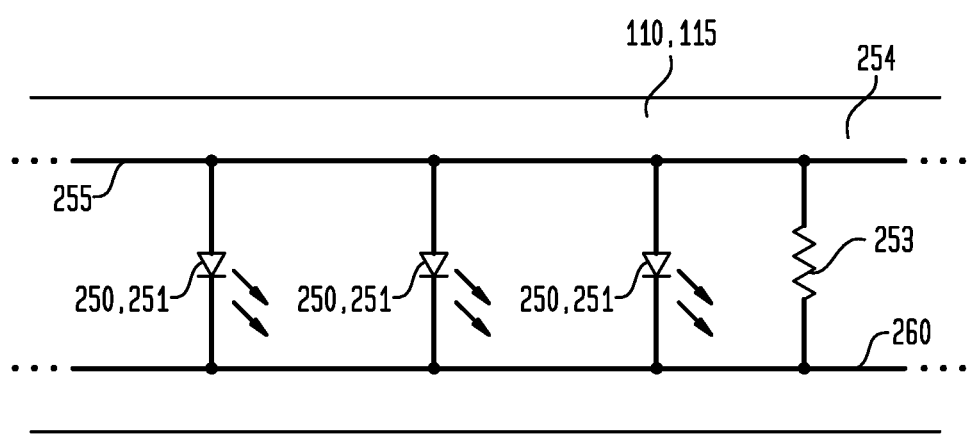
FIG. 11 is a circuit diagram of a representative embodiment of a flexible light strip used with the lighting system.

FIG. 8 is an isometric view illustrating a representative embodiment of female connectors 180A, 185A and mating male connectors 180B, 185B used with the lighting system 100. FIG. 9 is a photograph of representative embodiments of flexible light strips 110, 115 used with the lighting system 100. FIG. 10 is an isometric view illustrating a representative embodiment of flexible light strips 110, 115 with the power cable 120 and corresponding male connectors 180B, 185B and female connectors 180A, 185A used with the lighting system. FIG. 11 is a circuit diagram of a representative embodiment of a flexible light strip 110, 115 used with the lighting system 100.

Referring to FIG. 1, a lighting system 100 comprises, among other components, a lighting system container 105, illustrated as having the form of a flexible carrying bag 105 such as a backpack, and further comprising a first flexible light strip 110, a second flexible light strip 115, and a first, power cable 120. The lighting system container 105, such as a carrying bag 105, may be comprised of any material, such as a flexible material, including flexible materials such as waterproof (or water resistant) and rugged cordura nylon in representative embodiments, or other flexible materials such as cloth, canvas, nylon, ballistic nylon, leather and similar materials which may be a plurality of interwoven, knit, spun, blown, or otherwise routed, embedded or linked, polymeric or nonpolymeric fibers, filaments, cables, threads or yarns, or comprised of a nonflexible material, such as a hard or comparatively inflexible metallic or polymeric case, box, or crate, for example and without limitation. While illustrated as a carrying bag 105, such as for carrying by troops in a military environment, those having skill in the art will recognize that innumerable types of containers may be utilized equivalently, and any and all such containers 105 are considered equivalent and within the scope of the disclosure. As used herein, a lighting system carrying bag 105 is used interchangeably with lighting system container 105, and reference to a lighting system carrying bag 105 understood to mean and include any and all such lighting system containers 105, and vice-versa. The lighting system carrying bag 105 or other container may also include internal pouches or pockets, not separately illustrated, and any of various types of fasteners or attachments, such as Modular Lightweight Load-carrying Equipment ("MOLLE") fasteners and hook and loop (velcro) fasteners. As discussed in greater detail below, in a representative embodiment, the lighting system carrying bag 105, as a type of container, includes a first opening 130 and a second opening 107.

During transport, the first flexible light strip 110, the second flexible light strip 115, the power cable 120, and the other components discussed below may all be stowed or stored within the lighting system container (e.g., carrying bag) 105 or other suitable container. Many of the various components are assembled together or otherwise electrically coupled within the lighting system carrying bag 105, while other various components are either extended through an opening (e.g., the second opening 107) of the carrying bag 105 or are removed from the lighting system carrying bag 105 for assembly and deployment, such as in a troop tent, as discussed in greater detail below.

FIGS. 1, 2, and 4 also illustrate a control panel 125, visible through the first opening 130 of the lighting system carrying bag 105 when a control panel cover 140 has been opened, such as by releasing a first fastener 135, i.e., the control panel cover 140 is releasably or removably fastenable over the first opening 130 to either reveal or cover the face or exterior of the control panel 125. Also as illustrated, the lighting system carrying bag 105 may include a carrying handle 235 and/or carrying strap 235A.

FIG. 2 is an isometric, exploded view of a representative embodiment of the lighting system 100, showing the various components which are included (e.g., as a kit, when unassembled) in the lighting system 100, including the lighting system carrying bag 105, the control panel 125, the first flexible light strip 110, the second flexible light strip 115, the first power cable 120, a power supply 145, a mounting bracket 150, a second power supply cable 155, and flexible light strip holders 190 and hangers 340 (snap hook 195, paracord 265, adjustment clips 205). Not separately illustrated in FIG. 2 are: a third, battery power supply cable 210 (illustrated in FIG. 3), which is also generally included within the system 100 as an available option; the second embodiment of flexible light strip holders 280; and a splicing apparatus 330.

In a represenative embodiment, many of the electrical couplings or connections are made within the lighting system carrying bag 105, as discussed in greater detail below, which therefore provides added protection or security for the electrical couplings or connections, e.g., insulating the electrical couplings or connections from weather or other environmental conditions such as moisture.

The power supply 145 is deployed within the lighting system carrying bag 105 during use, with many of the electrical couplings or connections made within the carrying bag 105, and with the various cables (discussed below) extending out of the lighting system carrying bag 105 through the carrying bag second opening 107 formed when the second fastener 210 (illustrated as a zipper fastener 210) is released (unzipped), as illustrated in FIGS. 5 and 6. Those having skill in the art will recognize that innumerable different types of fasteners 135, 210 may be utilized, any and all of which are considered equivalent and within the scope of the disclosure.

The mounting bracket 150 provides a fixed structure within the lighting system carrying bag 105 for holding and securing the power supply 145 and the control panel 125, so that the power supply 145 may be electrically coupled to the control panel 125 within the lighting system carrying bag 105, and further to secure and arrange the control panel 125 to be visible through the first opening 130 of the lighting system carrying bag 105 when the control panel cover 140 has been opened, as illustrated in FIGS. 1, 2, 4 and 5. The control panel 125 is coupled to the mounting bracket 150 using third fasteners 245, such as using screws, bolts, hook and loop fasteners, etc. As an option, the control panel 125 may be further secured to the lighting system carrying bag 105, such as using fasteners 245, illustrated as one or more screws 245A in FIG. 4 coupling the control panel 125 to the lighting system carrying bag 105 around the periphery of the first opening 130. Those having skill in the art will recognize that innumerable different types of fasteners 245 may be utilized, any and all of which are considered equivalent and within the scope of the disclosure.

The power supply 145 may be implemented as known or becomes known in the electronic arts to convert AC power to DC power, e.g., in a representative embodiment, to provide a comparatively constant 24V with a comparatively constant current at 8-10 Amperes with 200-240 W, with an IP rating of IP67 and an IK rating of IK16. By "comparatively constant", those having skill in the art will recognize that such voltage and current levels may have an acceptable or specified range of variance, including ripple, generally within a predetermined level, e.g., 22-26 V or 7-11 A, for example and without limitation. In a representative embodiment, the power supply 145 includes two cables, a first, input power connecting cable 172 (to receive AC power) and a second, DC output connecting cable 174 (to provide DC power to the control panel 125) (as fourth and fifth cables of the overall lighting system 100), both for making electrical couplings or connections within the lighting system carrying bag 105. The first, input power connecting cable 172 includes a connector 165A, which is coupleable within the lighting system carrying bag 105 to a mating connector 165B of the power supply cable 155, which in a representative embodiment is comparatively a much longer cable. Alternatively, in another representative embodiment, the power supply cable 155 may be combined with the first, input power connecting cable 172 into a single cable. For deployment, the power supply cable 155 is extended out through the second opening 107 of the lighting system carrying bag 105, as shown in FIGS. 6 and 7. The power supply cable 155 also includes an AC connector (or AC electrical plug) 160, which may be inserted into an AC socket, such as an AC socket available in a generator (not separately illustrated), typically 100-277 V AC at 50-60 Hz (e.g., United States standard power, 120±5 V AC at 60±5 Hz, as well as the European standard, 280±5 V AC at 50±5 Hz).

The second, DC output connecting cable 174 includes a connector 170A, which is coupleable within the lighting system carrying bag 105 to a mating connector 170B of the control panel 125, for the control panel 125 to receive DC power from the power supply 145, as illustrated in FIG. 6. Alternatively, as discussed in greater detail below, the control panel 125 may receive DC power from a battery 305, using a battery power supply cable 210, which is also coupleable to the mating connector 170B of the control panel 125.

The various connectors 170A, 170B, 175A, 175B, 180A, 180B, 185A, 185B, as illustrated and as discussed in greater detail below, comprise a housing 182, and for male connectors, further comprise two prongs 184, 186, which are DC power connectors, with the first prong 184 for a positive DC voltage and the second prong 186 for a ground or negative DC voltage, or for female connectors, further comprise corresponding mating recesses 188, 192 (such as illustrated in FIG. 8 for connectors 180A, 180B, 185A, 185B). For each pair of connectors which will be coupled together, a first connector will be coupled to a second, mating connector, e.g., one connector is a male connector and the other connector is a female connector, such as illustrated in FIG. 8 for representative connector embodiments. For example, in a first embodiment, a female connector 170A will be coupled to a male connector 170B, a female connector 175A will be coupled to a male connector 175B, a female connector 180A will be coupled to a male connector 180B, and a female connector 185A will be coupled to a male connector 185B. Alternatively, in a second embodiment not separately illustrated, a male connector 170A will be coupled to a female connector 170B, a male connector 175A will be coupled to a female connector 175B, a male connector 180A will be coupled to a female connector 180B, and a male connector 185A will be coupled to a female connector 185B. In addition, the housing 182 of the various connectors 170A, 170B, 175A, 175B, 180A, 180B, 185A, 185B (such as illustrated in FIG. 8 for connectors 180A, 180B, 185A, 185B), in a representative embodiment, is generally comprised of a flexible material, e.g., rubber or a flexible polymer, which forms a waterproof or water resistant seal when each connector pair is coupled together. Additional sealing or seal locking may also be provided. While not separately illustrated, connectors 170A, 170B, 175A, 175B also have this two prong and mating recess structure with a housing 182. As such, the various connectors 170A, 170B, 175A, 175B, 180A, 180B, 185A, 185B may be implemented as known or becomes known in the art, and all such variations are considered equivalent and within the scope of the disclosure.

Batteries 305 (illustrated in FIG. 7) may be utilized instead of the power supply 145, using the battery power supply cable 210 which is coupled directly to the control panel 125. For example, within the lighting system carrying bag 105, the power supply 145 may be removed and one or more batteries 305 provided in its location instead. The battery power supply cable 210 has a plurality of connectors 215A, to couple to mating connectors 215B of the batteries 305. At the other end, the battery power supply cable 210 also includes a connector 170A which is coupleable within the lighting system carrying bag 105 to the mating connector 170B of the control panel 125, for the control panel 125 to receive DC power from one of the batteries 305 instead of from the power supply 145. During operation, to avoid a loss of light as batteries eventually lose power, a second battery 305 is typically attached to one of the connectors 215A before removing a first battery 305 from the other connector 215A. One or more batteries 305 may be stored and coupled to the control panel 125 within the lighting system carrying bag 105, or as illustrated in FIG. 7, may be provided external to (on the outside of) the lighting system carrying bag 105. When a battery 305 is utilized, the connector 170A of battery power supply cable 210 is coupled to the mating connector 170B of the control panel 125 in lieu of the connector 170A of the second, DC output connecting cable 174 of the power supply 145, illustrated using the arrow shown in FIG. 7.

The power cable 120 includes a connector 175A, which is coupleable to a mating connector 175B of the control panel 125. For deployment, the power cable 120 is coupled to the control panel 125, with connector 175A of the power cable 120 coupled to the mating connector 175B of the control panel 125, all within the lighting system carrying bag 105. Most of the power cable 120 is extended out through the second opening 107 of the lighting system carrying bag 105, as shown in FIGS. 6 and 7. The power cable 120 includes two separate power supply lines or wires, which are divided or split out into power cable 120A and 120B having, respectively, separate connectors 180A and 185A, which are coupled respectively to the first flexible light strip 110 and the second flexible light strip 115 through mating connectors 180B and 185B, respectively. The first and second flexible light strips 110, 115 are then electrically coupled through power cable 120 to the control panel 125, to receive DC power. Once assembled, the control panel 125 provides switchable and controllable DC power, from either the power supply 145 or the battery 305, through the power cable 120 and to the first flexible light strip 110 and to the second flexible light strip 115.

Referring to FIGS. 2 and 4, the control panel 125 generally comprises a dimmer switch 225 (to adjust or dim the light (lumen) output from the first flexible light strip 110 or the second flexible light strip 115), a selection switch 220 (to select light output from either the first flexible light strip 110, or from the second flexible light strip 115, or to turn off both the first flexible light strip 110 and the second flexible light strip 115), and a plurality of Universal Serial Bus ("USB") ports 230 (such as for charging other devices, such as computers, mobile telephones or smartphones, for example and without limitation), which are illustrated having removable covers 232 in FIG. 4. The dimmer switch 225, the selection switch 220, and the USB ports 230 may be implemented as known or becomes known in the art, and all such variations are considered equivalent and within the scope of the disclosure.

FIG. 15 is a graphical diagram (or chromaticity chart) illustrating a selected chromaticity range 350 for the second flexible light strip 115 for selected embodiments of the lighting system 100, such as for military applications. For example, for military deployment, the first flexible light strip 110 typically comprises a first plurality of light emitting diodes ("LEDs") 250 which emit white light (e.g., white or cool white (between 3900K and 6000K), and the second flexible light strip 115 typically comprises a second plurality of LEDs 251 which emit "blackout" light, i.e., light having a selected chromaticity range suitable for use during blackouts, as specified below. The selection switch 220 is used to select light output from either the first flexible light strip 110 or the second flexible light strip 115, but not both at the same time. Referring to FIG. 15, when the second flexible light strip 115 is implemented to provide blackout lighting, as an option, the emitted light has a blue-green color to fall within a predetermined or allowable color circle or chromaticity or spectral range 350 to meet the chromaticity requirements of u'=0.079, v'=0.494, r'=0.055 as illustrated.

Alternatively, in other representative embodiments, the first flexible light strip 110 and the second flexible light strip 115 (and/or their respective LEDs 250, 251) may be selected to have any desirable output spectrum or chromaticity range. For example and without limitation, both the first flexible light strip 110 and the second flexible light strip 115 may be selected to emit white light, or both the first flexible light strip 110 and the second flexible light strip 115 may be selected to emit blackout light, or either or both the first flexible light strip 110 and the second flexible light strip 115 may be selected to emit any selected range or spectra of light.

In representative embodiments, a flexible light strip 110, 115 is provided in a length of 12 meters, with a cross-section of 9 by 6.5 mm, operating at 24 V DC and 0.6 A/m and 15 W/m, with an average output of 870 lumens/m and a total lumen output of 10,450 over 12 m, with an IP rating of IP67 and an IK rating of IK16 and a voltage drop of less than 10% over 12 m.

Representative embodiments of the first flexible light strip 110 and the second flexible light strip 115 are illustrated in FIGS. 9-14. As illustrated in FIG. 11, flexible light strips 110, 115 have the same structure, and differ only in the type of LED 250, 251 utilized to provide the selected type of emitted light. A plurality of LEDs 250 or 251 are arranged in parallel between two power lines (or wires), a positive voltage power line 255 and a ground (or negative) power line 260, which are in turn coupled to the corresponding prongs of the connectors 180A, 180B, 185A, 185B. Additional segments of the parallel LEDs 250, 251 may also be joined together in series or in parallel with each other (not separately illustrated). Additional circuit elements may also be included, as an option, such as a resistor 253 (in parallel as illustrated, or in series (not separately illustrated), or other circuit elements, such as capacitors (also not separately illustrated). The power lines 255, 260 with the parallel LEDs 250, 251 are then embedded (e.g., molded or extruded) in a polymeric casing 254, which in selected embodiments is provided in a semi-cylindrical form, having a curved or domed side 256 and a flat side 258. The domed side 256 provides lensing capability for even light distribution and reduced shadowing. In addition, not separately illustrated, the flat side 258 may also include various reflectors, such as to increase light output.

Figure 12A:
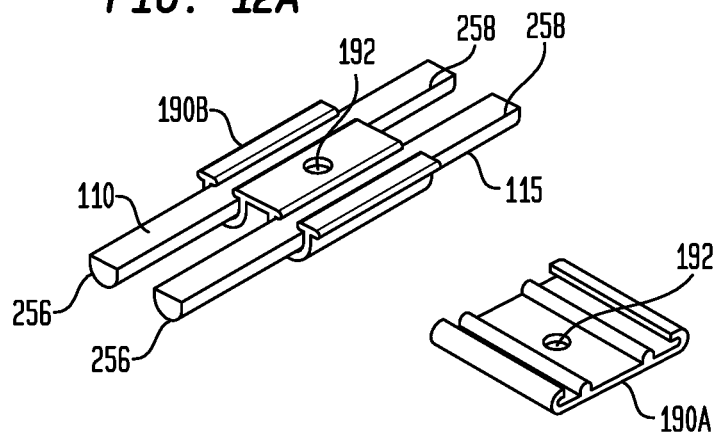
FIGS. 12A, 12B, 12C, and 12D (collectively referred to as FIG. 12) are isometric views illustrating a representative first embodiment of a flexible light strip holder and hangers of the lighting system.
Figure 12B:
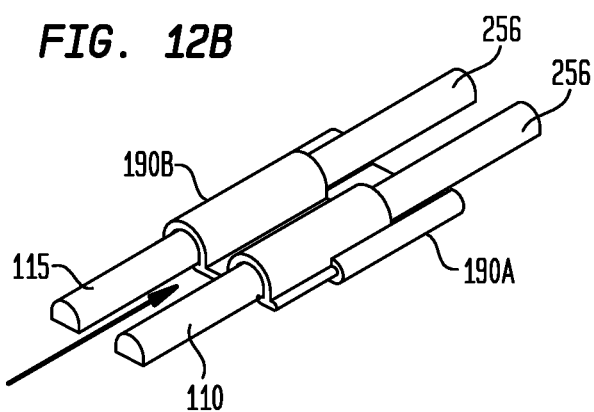
Figure 12C:
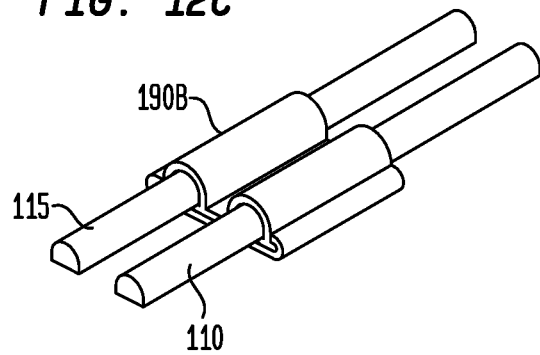
Figure 12D:
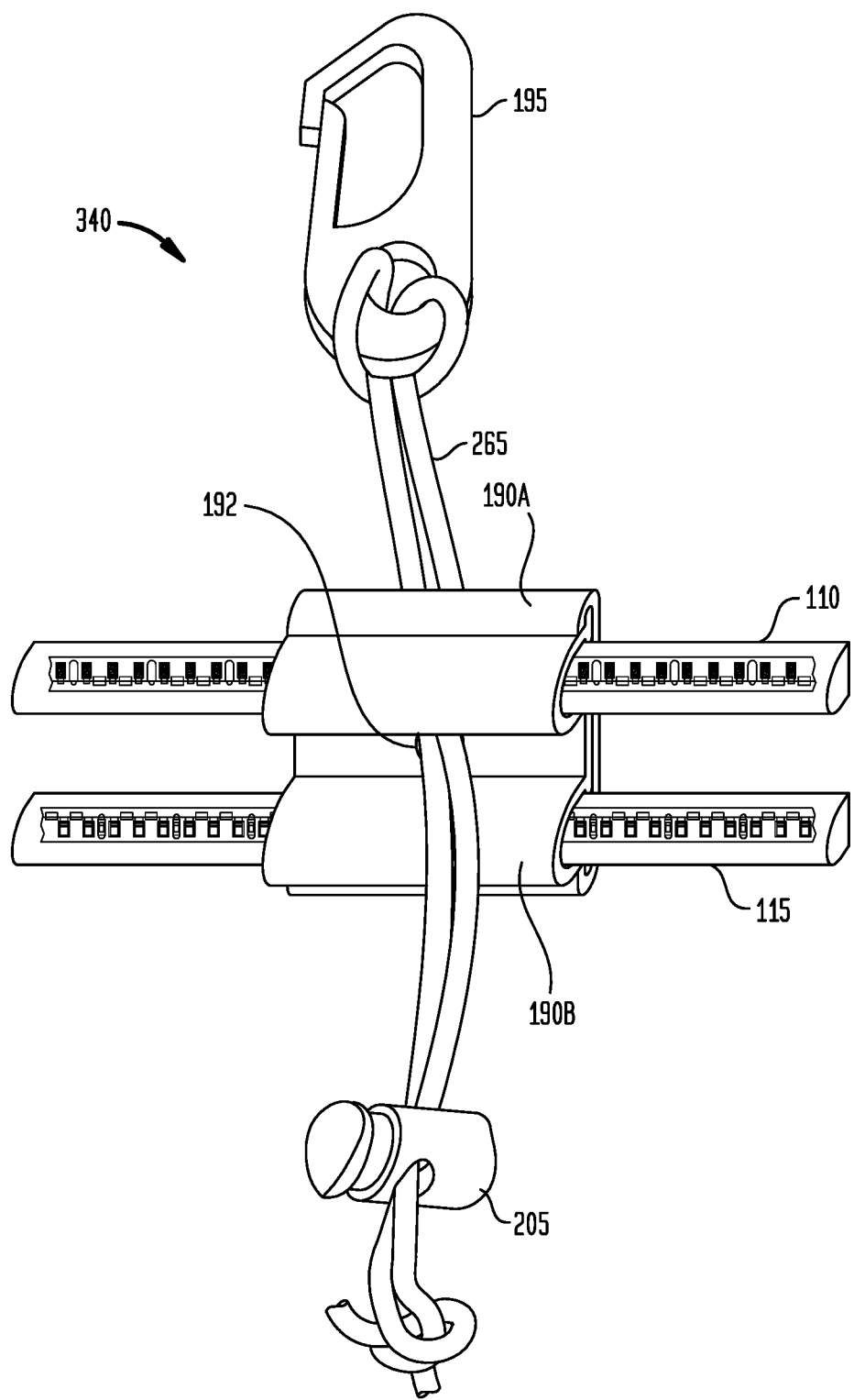

FIGS. 12A, 12B, 12C, and 12D (collectively referred to as FIG. 12) are isometric views of a representative first embodiment of flexible light strip holders 190A, 190B and hangers 340 (snap hook 195, paracord 265, adjustment clips 205) of the lighting system 100. For assembly and deployment, as illustrated in FIGS. 12A-12D, the curved or domed sides 256 of a first flexible light strip 110 and a second flexible light strip 115 are arranged within curved portions of a first flexible light strip holder 190B (as illustrated in FIG. 12A), and a second, mating flexible light strip holder 190A is coupled over the flat sides 258 and slid into position over the first flexible light strip holder 190B (as illustrated in FIGS. 12B and 12C). A paracord 265 is coupled to a snap hook 195 and slid or pushed through the holes 192 of the aligned first and second flexible light strip holders 190B, 190A, and held in place at a selected length using an adjustment clip 205, to form an assembled hanger 340 (as illustrated in FIG. 12D). The assembled hanger 340 may then be attached, through the snap hook 195, to another structure, such as an overhead tent pole or rod 262 (illustrated in FIG. 7), and as assembled, both the first flexible light strip 110 and the second flexible light strip 115 are thereby positioned overhead and the curved or domed side 256 is properly oriented to emit light downward. Those having skill in the art will recognize, however, that the the first flexible light strip 110 and the second flexible light strip 115 may have a wide variety of placements, positions and orientations in the lighting system 100, and all such placements, positions and orientations are considered within the scope of the disclosure.

Figure 13A:
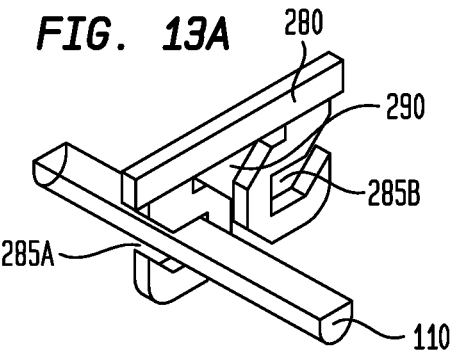
FIGS. 13A, 13B, 13C, and 13D (collectively referred to as FIG. 13) are isometric views illustrating a representative second embodiment of flexible light strip holder and hanger of the lighting system.
Figure 13B:
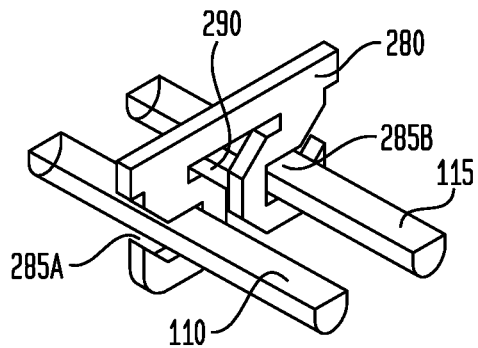
Figure 13C:
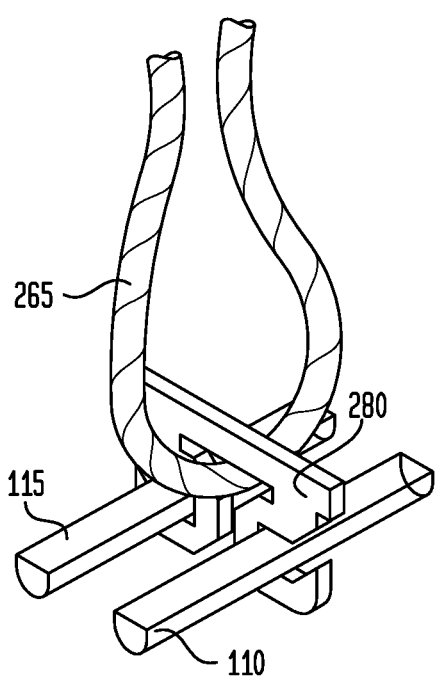
Figure 13D:
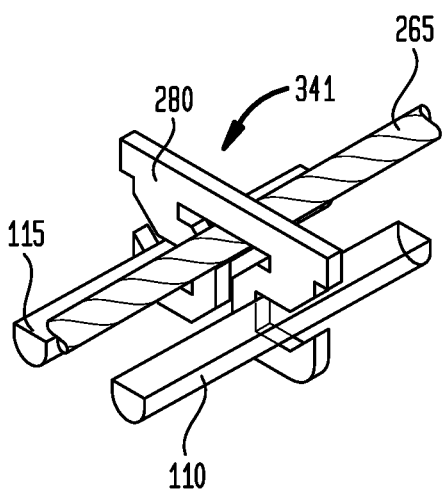

FIGS. 13A, 13B, 13C, and 13D (collectively referred to as FIG. 13) are isometric views of a representative second embodiment of a flexible light strip holder 280 of the lighting system 100. The holder 280 is itself flexible, allowing insertion of flexible light strips 110, 115 into spaced-apart apertures 285A, 285B, which are shaped to provide the proper orientation of the flexible light strips 110, 115, e.g., curved or domed side 256 facing down (as illustrated in FIGS. 13A and 13B). A paracord 265 is inserted through or into aperture 290 (as illustrated in FIGS. 13C and 13D). The assembled hanger 341 may then be attached to another structure, as discussed above, such as to hang within a tent, for example and without limitation. Alternatively, without using the paracord 265, the holder 280 could be directly attached to another structure, such as coupling the aperture 290 directly to an overhead tent pole, also for example and without limitation.

Figure 14:
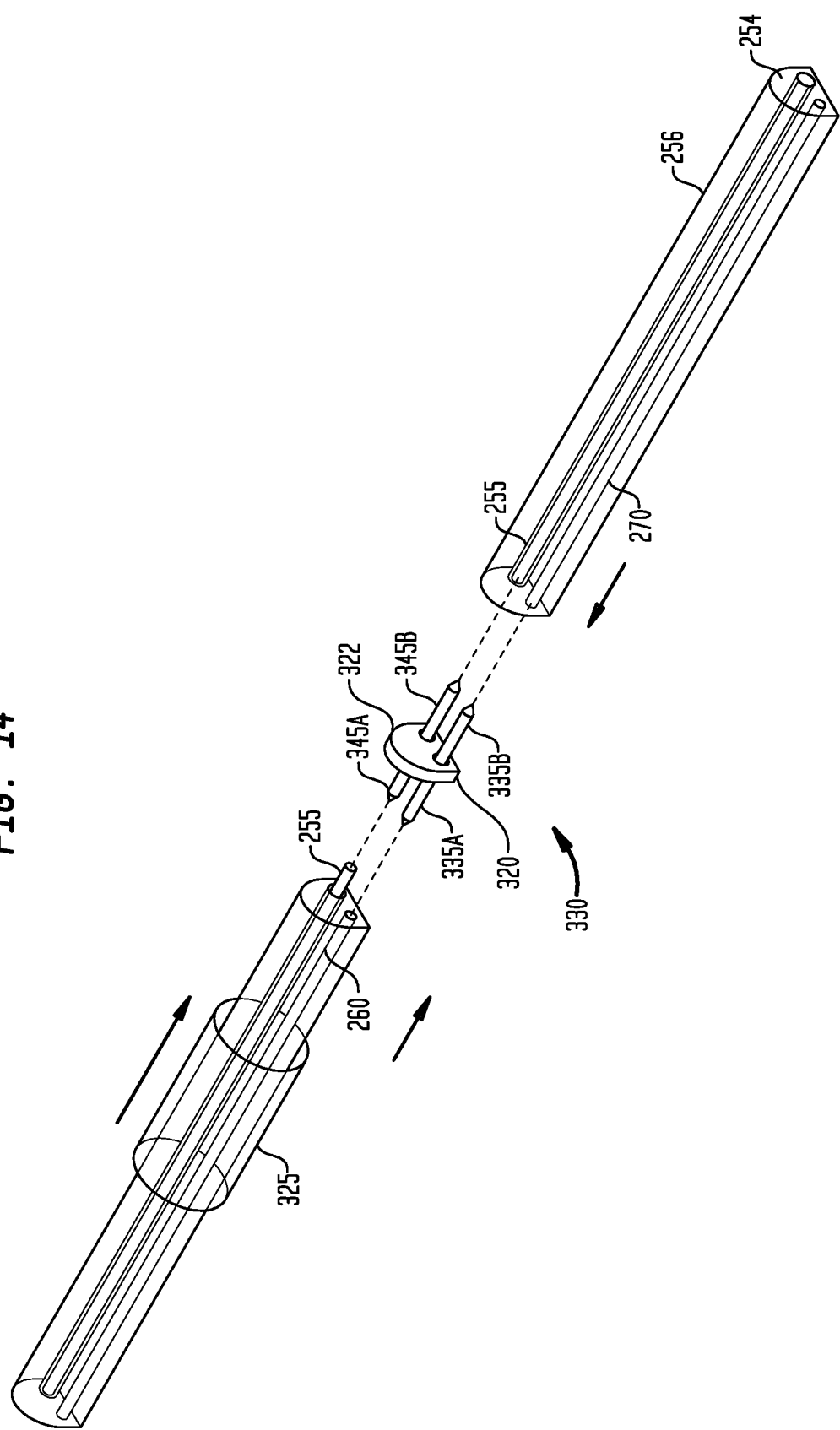
FIG. 14 is an isometric, exploded view illustrating a representative embodiment of a disassembled splicing apparatus used with the lighting system.

FIG. 14 is an isometric, exploded view of a representative embodiment of a dissassembled splicing apparatus 330 used with the lighting system. One of the highly resilient aspects of the lighting system 100 is the capability to remove any part of the flexible light strips 110, 115 which may have a defect, such as any part of a flexible light strip 110, 115 which may have become damaged during deployment, e.g., in a battlefield environment. The damaged portion of the flexible light strip 110, 115 is removed, such as by cutting with a knife, and the remaining sections of the flexible light strip 110, 115 may be spliced together, as illustrated in FIG. 14, using a splicing apparatus 330. The splicing apparatus 330 comprises a splice connector 320 and a splice cover 325.

The splice connector 320 comprises a plurality of barbed prongs 335A, 335B, 345A, 345B which are arranged as electrically coupled splicing pairs, splicing pair 335A, 335B (with barbed prong 335A electrically coupled to barbed prong 335B within prong holder 322), and splicing pair 345A, 345B (with barbed prong 345A electrically coupled to barbed prong 345B within prong holder 322). The splice connector 320 is then inserted into a first section of the flexible light strip 110, 115 and then into the second section of the flexible light strip 110, 115, with barbed prongs 345A, 345B connecting and electrically coupling together each respective positive voltage power line 255, and with barbed prongs 335A, 335B connecting and electrically coupling together each respective negative or ground line 260, thereby electrically coupling the two sections of flexible light strip 110, 115 together. The splice cover 325 is typically embodied as a dual-walled, adhesive lined clear heat shrink tube, which is then slid over the coupling or joint and heated, to prevent dust and water ingress, for example.

FIG. 16 is a flow chart illustrating a method of assembly and deployment of a representative embodiment of the lighting system 100, and demonstrates ease of assembly and further provides a useful summary. The lighting system 100 has been provided as a kit with the power supply 145 and the control panel 125 already having been coupled or otherwise secured to the mounting bracket 150 within the lighting system carrying bag 105 (and if not so provided, then the power supply 145 and the control panel 125 are coupled or otherwise secured to the mounting bracket 150, such as using fasteners 245, 245A, as previously discussed). It should be noted that the various steps may occur in a wide variety of orders and also concurrently, and all such variations are within the scope of the disclosure. Beginning with start step 400, when AC power is to be utilized, step 405, the power supply cable 155 is coupled to the power supply 145 within the lighting system carrying bag 105, coupling the connector 165B of the power supply cable 155 to the mating connector 165A of the first, input power connecting cable 172 of the power supply 145, step 410, and the DC output connecting cable 174 of the power supply 145 is coupled to the control panel 125 within the lighting system carrying bag 105, coupling the connector 170A of the DC output connecting cable 174 to the mating connector 170B of the control panel 125, step 415. Portions of the power supply cable 155 are then extended out of the second opening 107 of the lighting system carrying bag 105 and the power supply cable 155 (using plug or connector 160) may then be coupled to a power source, such as a generator, step 420.

Alternatively, when AC power is not to be utilized in step 405, the battery power supply cable 210 is coupled to the control panel 125 within the lighting system carrying bag 105, coupling the connector 170A of the battery power supply cable 210 to the mating connector 170B of the control panel 125, step 425. The battery power supply cable 210 may then be coupled to one or more batteries 305, step 430, coupling the connector 215A of the battery power supply cable 210 to mating connector 215B of each battery 305.

Before, concurrently with or after any of these steps, the power cable 120 is then coupled to the control panel 125 within the lighting system carrying bag 105, coupling the connector 175A of the power cable 120 to the mating connector 175B of the control panel 125, step 435. Before, concurrently with or after any of these steps, the first flexible light strip 110 and the second flexible light strip 115 are inserted or assembled into any of the various holders and/or hangers 340, 341 and positioned, such as coupled to a tent pole, for example and without limitation, step 440. Portions of the power cable 120 and are then extended out of the second opening 107 of the lighting system carrying bag 105, and the power cable 120 is then coupled to the first flexible light strip 110 and to the second flexible light strip 115, step 445, coupling the connector 180A of the power cable 120 to mating connector 180B of the first flexible light strip 110, and coupling the connector 185A of the power cable 120 to mating connector 185B of the second flexible light strip 115, completing the assembly and deployment of the lighting system 100. The method of assembly and deployment of the lighting system 100 may end, return step 450.

Color coding may also be implemented to aid the assembly and deployment of the flexible lighting system 100. For example and without limitation, the power cable 120 may comprise a first connector 175A which has a first color (e.g., blue), and the control panel 125 may further comprise a mating, output DC connector 175B also having the first color (e.g., blue), and be couplable within the carrying bag 105 to the first connector 175A of the power cable 120. In addition, the power cable 120 may further comprise a plurality of second connectors 180A, 185A having respective second and third colors ((e.g., green and yellow), and each of the first flexible light strip and the second flexible light strip may further comprise a mating third connector 180B, 185B having the respective second and third colors (e.g., green and yellow) and which are couplable to a corresponding second connector 180A, 185A (having the same colors) of the power cable 120. Also for example and without limitation, the control panel 125 may further comprise an input DC connector 170B which has a fourth color (e.g., orange), and the power supply 125 may further comprise a DC output connecting cable 174 having a mating connector 170A which has the fourth color (e.g., orange) and which is couplable within the carrying bag 105 to the input DC connector 170B (having the same color) of the control panel 125. In addition, the battery power supply cable 210 may also comprise a connector 170A which has the fourth color (e.g., orange) couplable within the carrying bag 105 to the input DC connector 170B (having the same color) of the control panel 125, and further comprise at least one connector 215A which has a fifth color (e.g., purple) couplable to one or more mating connectors 215B which have the fifth color (e.g., purple) of one or more batteries 305. Also for example and without limitation, a power supply cable 155 may comprise a first connector 160 at a first end couplable to receive AC power and further comprise a second connector 165B at a second end which has a sixth color (e.g., red), which is couplable within the carrying bag 105 to a mating connector 165A which has the sixth color (e.g., red) of the input power connecting cable 172 of the power supply 145. With this color coding, the user can simply couple together the connectors having the same respective color to assemble and deploy the flexible lighting system 100.

Numerous advantages of the representative embodiments are readily apparent. Various representative embodiments provide a flexible lighting system 100 which is portable, robust, and capable of ready assembly to provide lighting in rugged, difficult or problematic industrial or hostile environments. Representative embodiments of the lighting system 100 are comparatively easy and rapid to assemble and deploy, such as in military tents.

The representative embodiments of the lighting system 100 utilize flexible light strips 110, 115, which may be hung in structures such as tents. Once they are installed, they may be left installed and the tent stored, allowing for a one-time setup. The representative embodiments of the lighting system 100 include an integrated power supply 145 and/or battery 305, with a control panel 125 providing switching and dimming capability, including switching between white light and blackout light, all contained within a portable carrying bag. The representative embodiments of the flexible light strips 110, 115 provide for comparatively even light distribution, with considerably less shadowing compared to prior art lighting systems. The representative embodiments of the lighting system 100 are also light weight and water resistant, capable of operating in rugged environments, such as military deployments and camps. The representative embodiments of the lighting system also may operate in either AC or DC environments.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening sub-range within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A lighting system comprising:
a carrying bag forming a container having an interior and an exterior, the carrying bag having a first opening extending through the carrying bag between the interior and the exterior and a second opening extending through the carrying bag for access to the interior, the carrying bag further having a control panel cover removably fastenable over the first opening;
a mounting bracket arranged in the interior of the carrying bag;
a power supply coupled to or arranged on the mounting bracket;
a control panel arranged within the first opening and coupled to the mounting bracket and to a periphery of the first opening, the control panel visible through the first opening when the control panel cover is unfastened, and the control panel operable from the exterior of the carrying bag;
a first flexible light strip deployable exterior to the carrying bag;
a second flexible light strip deployable exterior to the carrying bag; and
a power cable coupleable to the control panel, to the first flexible light strip, and to the second flexible light strip, the power cable extendable through the second opening to the exterior of the carrying bag.

2. The lighting system of claim 1, further comprising:
a plurality of hangers coupleable to the first flexible light strip and the second flexible light strip, the plurality of hangers adapted to secure the first flexible light strip and the second flexible light strip to a structure exterior to the carrying bag.

3. The lighting system of claim 2, wherein the plurality of hangers comprise:
a plurality of light strip holders adapted to secure the first flexible light strip and the second flexible light strip;
at least one length of paracord coupleable to a light strip holder of the plurality of light strip holders;
a plurality of snap hook fasteners, at least one snap hook fastener of the plurality of snap hook fasteners coupleable to the at least one length of paracord; and
a plurality of adjustment clips, at least one adjustment clip of the plurality of adjustment clips coupleable to the at least one length of paracord.

4. The lighting system of claim 1, wherein the control panel comprises:
a dimmer switch to adjust light output from the first flexible light strip or the second flexible light strip;
a selection switch adapted to select either the first flexible light strip for light output, the second flexible light strip for light output, and turn off both the first flexible light strip and the second flexible light strip; and
one or more universal serial bus (USB) ports.

5. The lighting system of claim 1, wherein the power cable comprises a first connector, and wherein the control panel further comprises a mating, output direct current (DC) connector coupleable within the carrying bag to the first connector of the power cable.

6. The lighting system of claim 5, wherein the power cable further comprises a plurality of second connectors, and each of the first flexible light strip and the second flexible light strip further comprise a mating third connector coupleable to a corresponding second connector of the power cable.

7. The lighting system of claim 1, wherein the control panel further comprises an input direct current (DC) connector, and wherein the power supply further comprises a DC output connecting cable having a mating connector coupleable within the carrying bag to the input DC connector of the control panel.

8. The lighting system of claim 7, further comprising:
a power supply cable having a first end and a second end, the power supply cable comprising a first connector at the first end coupleable to receive alternating current (AC) power and further comprising a second connector at the second end.

9. The lighting system of claim 8, wherein the power supply further comprises an input power connecting cable having a mating connector coupleable within the carrying bag to the second connector of the power supply cable.

10. The lighting system of claim 1, wherein the control panel further comprises an input direct current (DC) connector, and wherein the lighting system further comprises:
a battery power supply cable having at least one first connector coupleable to one or more mating connectors of one or more batteries and having a second connector coupleable within the carrying bag to the input DC connector of the control panel.

11. The lighting system of claim 1, wherein the power supply is operable to receive alternating current (AC) power at 120-280±5 V AC at 50-60±5 Hz and wherein the power supply is adapted to generate 24 V direct current (DC) at 8-10 Amperes with 200-240 W.

12. The lighting system of claim 1, wherein at least one of the first flexible light strip or the second flexible light strip comprises a plurality of light emitting diodes adapted to emit light having a spectrum within a chromaticity range of as u'=0.079, v'=0.494, and r'=0.055.

13. The lighting system of claim 1, wherein the mounting bracket, the power supply, the control panel, the first flexible light strip, the second flexible light strip, and the power cable are provided as a kit within the carrying bag.

14. A lighting system comprising:
a carrying bag forming a container having an interior and an exterior, the carrying bag having a first opening extending through the carrying bag between the interior and the exterior and a second opening extending through the carrying bag for access to the interior, the carrying bag further having a control panel cover removably fastenable over the first opening;
a mounting bracket arranged within the interior of the carrying bag;
a power supply coupled to or arranged on the mounting bracket;
a control panel arranged within the first opening and coupled to the mounting bracket and to a periphery of the first opening, the control panel visible through the first opening when the control panel cover is unfastened, and the control panel operable from the exterior of the carrying bag;
a first flexible light strip deployable exterior to the carrying bag;
a second flexible light strip deployable exterior to the carrying bag;
a power cable coupleable to the control panel within the carrying bag, and extendable through the second opening exterior to the carrying bag to couple to the first flexible light strip and to the second flexible light strip;
a plurality of hangers or holders coupleable to the first flexible light strip and the second flexible light strip, the plurality of hangers adapted to secure the first flexible light strip and the second flexible light strip to a structure exterior to the carrying hg;
a battery power supply cable coupleable to the control panel and to one or more batteries; and
a power supply cable coupleable to the power supply and to an alternating current (AC) source.

15. The lighting system of claim 14, wherein the control panel comprises:
a dimmer switch to adjust light output from the first flexible light strip or the second flexible light strip;
a selection switch adapted to select either the first flexible light strip for light output, the second flexible light strip for light output, and turn off both the first flexible light strip and the second flexible light strip; and
one or more universal serial bus (USB) ports.

16. The lighting system of claim 14, wherein the power cable comprises a first connector and a plurality of second connectors, wherein the control panel further comprises a mating, output direct current (DC) connector coupleable within the carrying bag to the first connector of the power cable, and wherein each of the first flexible light strip and the second flexible light strip further comprise a mating third connector coupleable to a corresponding second connector of the plurality of second connectors of the power cable.

17. The lighting system of claim 16, wherein the control panel further comprises an input direct current (DC) connector, wherein the power supply further comprises a DC output connecting cable having a first mating connector coupleable within the carrying bag to the input DC connector of the control panel, wherein the power supply cable has a first end and a second end, the power supply cable comprising a first connector at the first end coupleable to receive the AC power and further comprising a second connector at the second end, and wherein the power supply further comprises a input power connecting cable having a second mating connector coupleable within the carrying bag to the second connector of the power supply cable.

18. A method of deploying the lighting system of claim 14, comprising:
arranging the first flexible light strip and the second flexible light strip at one or more selected locations;
connecting the power cable to the control panel within the carrying bag;
extending the power cable through the second opening and coupling the power cable to the first flexible light strip and the second flexible light strip;
coupling the power supply to the control panel within the carrying bag;
coupling the power supply cable to the power supply; and
coupling the power supply cable to receive the AC power.

19. A method of deploying the lighting system of claim 14, comprising:
arranging the first flexible light strip and the second flexible light strip at one or more selected locations;
connecting the power cable to the control panel within the carrying bag;
extending the power cable through the second opening and coupling the power cable to the first flexible light strip and the second flexible light strip;
coupling the battery power supply cable to the control panel within the carrying bag; and
coupling the battery power supply cable to one or more batteries.

20. A lighting system comprising:
a first flexible light strip;
a second flexible light strip;
a plurality of hangers coupleable to the first flexible light strip and the second flexible light strip;
a carrying bag having a first opening and a second opening, the carrying bag further having a control panel cover removably fastenable over the first opening;
a power cable extendable through the second opening and coupleable to the first flexible light strip and to the second flexible light strip;
a mounting bracket arranged within the carrying bag;
a power supply coupled to or arranged on the mounting bracket, the power supply operable to receive alternating current (AC) power at 120-280±5 V AC at 50-60±5 Hz and wherein the power supply is adapted to generate 24 V direct current (DC) at 8-10 Amperes with 200-240 W;

a control panel arranged within the first opening, the control panel coupled to the mounting bracket, the control panel electrically coupled to the power supply and to the power cable, the control panel comprising:
- a dimmer switch to adjust light output from the first flexible light strip or the second flexible light strip;
- a selection switch adapted to select either the first flexible light strip for light output, the second flexible light strip for light output, or turn off both the first flexible light strip and the second flexible light strip; and
- one or more universal serial bus (USB) ports; and at least one of a battery power supply cable or a power supply cable, the battery power supply cable coupleable to the control panel and to one or more batteries and the power supply cable coupleable to the power supply and to an alternating current (AC) source.

* * * * *